United States Patent [19]

Pope

[11] Patent Number: 4,591,946

[45] Date of Patent: May 27, 1986

[54] CAPACITANCE PROBE FOR USE IN A MEASURING SYSTEM FOR LOCATION OF A LIQUID LEVEL INTERFACE

[75] Inventor: Woodrow W. Pope, Garland, Tex.

[73] Assignee: Southwest Pump Company, Plano, Tex.

[21] Appl. No.: 729,068

[22] Filed: Apr. 30, 1985

[51] Int. Cl.$^4$ .................. H01G 5/28; G01F 23/26
[52] U.S. Cl. ............................. 361/284; 73/304 C
[58] Field of Search .............. 361/284; 364/506, 509; 377/19, 21; 324/61 R, 60 C; 73/304 C, 304 R

[56] References Cited

U.S. PATENT DOCUMENTS

| | | | |
|---|---|---|---|
| 3,777,257 | 12/1973 | Geisselmann | 73/304 C X |
| 4,349,882 | 9/1982 | Asmundsson et al. | 364/509 |
| 4,418,571 | 12/1983 | Asmundsson et al. | 73/304 C |

*Primary Examiner*—L. T. Hix
*Assistant Examiner*—Douglas S. Lee
*Attorney, Agent, or Firm*—Harold E. Meier

[57] ABSTRACT

An elongated capacitance probe for use in a measuring system for locating a liquid level interface in a tank is provided. The probe includes an outer casing having first and second substantially semi-circular matingly engaging portions, the outer casing having top and bottom ends defining a length thereof approximately equal to a height of the tank. Spacers are mounted in opposed relation in the outer casing to form spacer pairs, the spacer pairs located in a spaced apart relationship along a longitudinal axis of the outer casing. A plurality of ground plates are mounted in a spaced apart relationship in the spacer pairs. To locate the liquid level interface in the tank, one or more capacitor plates are mounted in the spacer pairs, each capacitor plate mounted between a pair of ground plates, and extending substantially the length of the outer casing. Each of the capacitor plates in combination with a ground plate forms a capacitor extending substantially the entire length of the outer casing. An additional capacitor plate is mounted in the spacer pairs adjacent the bottom end of the outer casing for measuring an amount of water in the tank.

10 Claims, 4 Drawing Figures

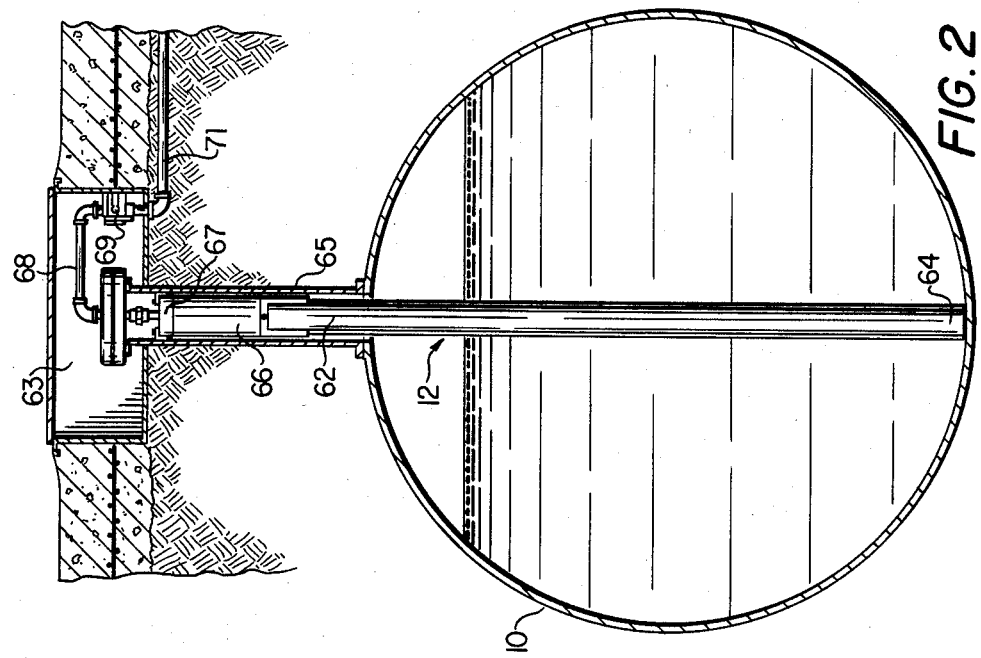
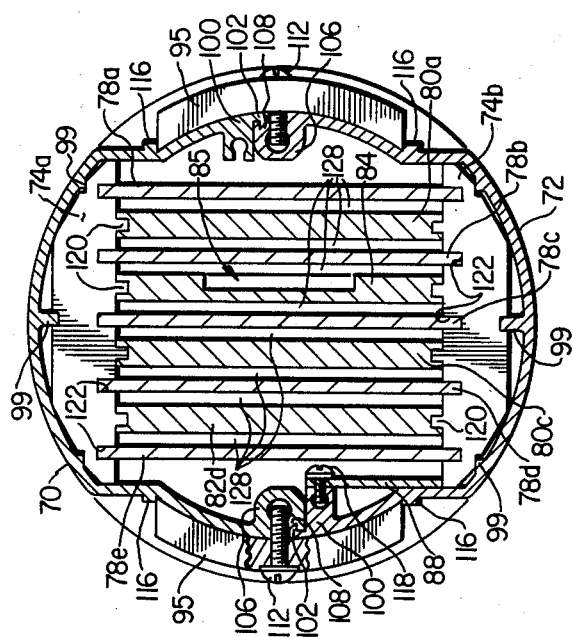

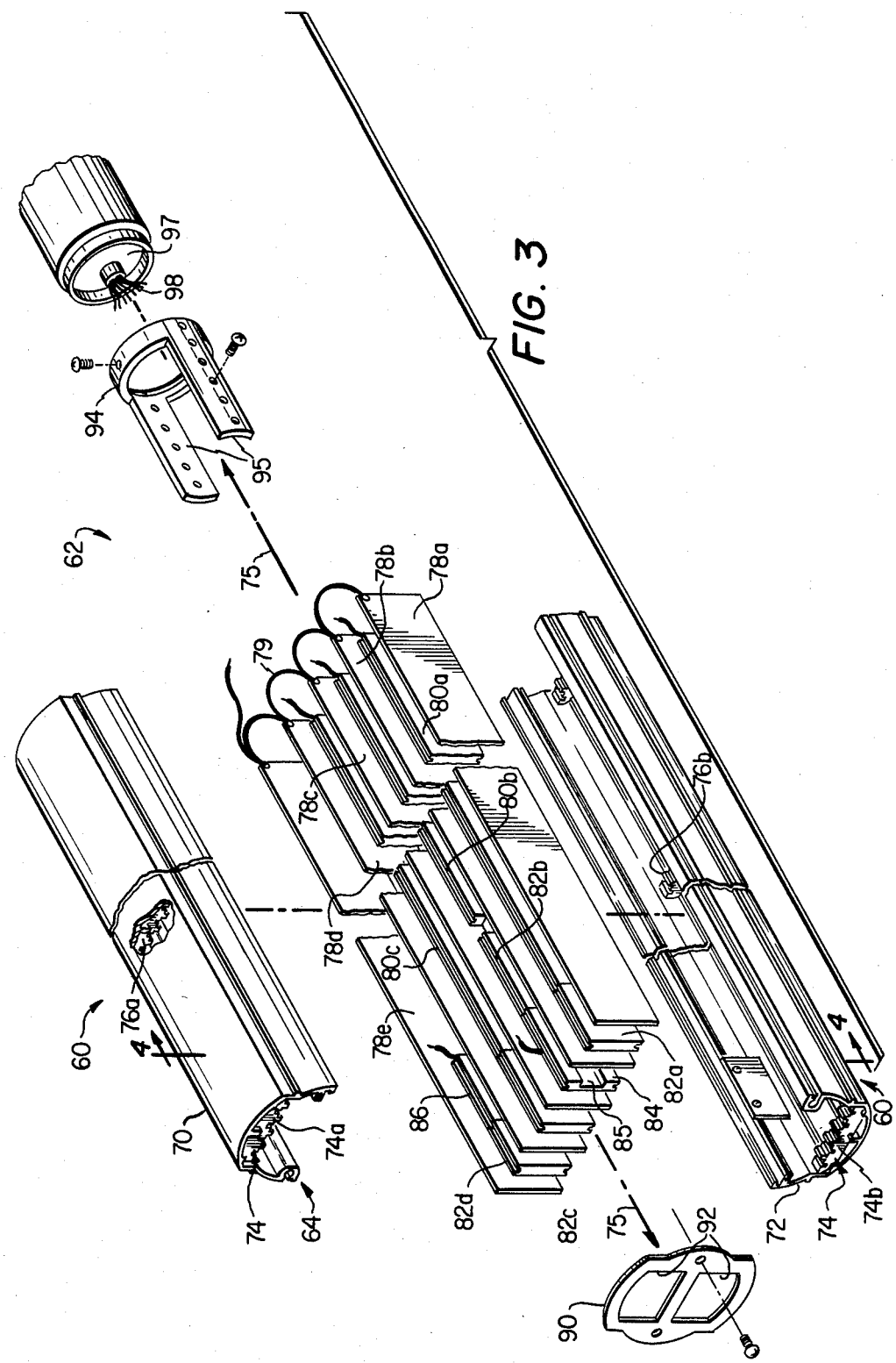

CAPACITANCE PROBE FOR USE IN A MEASURING SYSTEM FOR LOCATION OF A LIQUID LEVEL INTERFACE

TECHNICAL FIELD

The present invention relates to measuring apparatus, and more particularly to a capacitance probe for use in a measuring system for location of a liquid level interface.

BACKGROUND OF THE INVENTION

It is known in the prior art to use an elongated, multiple-segment capacitance probe for determining the volume of fuel in an underground fuel storage tank. One such system is described in U.S. Pat. No. 4,349,882, which teaches a method and apparatus for determining liquid level and volume of fuel in a storage tank through use of such a probe. U.S. Pat. No. 3,777,257 also describes measuring apparatus incorporating a capacitance probe for measuring the volume of fuel within a tank. The above-identified patents are representative of systems available for replacing a conventional measuring stick approach for determining the liquid level interface and volume of fuel in an underground storage tank.

An improved capacitance probe structure has also been described in copending application entitled "Liquid Level and Volume Measuring Method and Apparatus", Ser. No. 517,590, filed July 27, 1983, and assigned to the assignee of the present application. This copending application describes an elongated, multiple-segment capacitance probe for use in a measuring system for locating a liquid level interface. The probe includes a support having an elongated center section as one plate of a plurality of capacitors. A first plurality of flat capacitor plates is mounted in a spaced apart overlapping arrangement to the center section of the support along the longitudinal axis thereof and parallel therewith. A second plurality of flat capacitor plates is also mounted in a spaced apart overlapping arrangement to the center section of the support along the longitudinal axis thereof and in a position opposite and displaced from the first plurality of capacitor plates. Each of the capacitor plates comprises an individual capacitor with the center section of the support.

Although the multiple segment capacitance probe structure described in the above-identified application has proved advantageous for determining the liquid level interface within a tank, it is has now been found that this overlapping capacitor structure is not required to precisely determine this interface. Accordingly, the present invention describes an improved capacitance probe structure for use in a measuring system for location of a liquid level interface in an underground storage tank.

BRIEF DESCRIPTION OF THE INVENTION

In accordance with the present invention, there is provided an elongated capacitance probe for use in a measuring system for locating a liquid level interface in a tank. The capacitance probe comprises an outer casing having first and second matingly engaging portions, the outer casing having top and bottom ends defining a length thereof approximately equal to a height of the tank. Spacers are mounted in the first and second portions in opposed relation to form spacer pairs, and the spacer pairs are located in a spaced apart relationship along a longitudinal axis of the outer casing. To determine the location of the liquid level interface in the tank, one or more capacitor plates are mounted in a spaced apart relationship in the spacer pairs, each extending substantially the length of the outer casing. A ground plate is mounted adjacent each of the one or more capacitor plates such that each capacitor/ground plate combination forms a capacitor extending substantially the length of the outer casing. The capacitance probe also includes a bottom capacitor plate mounted in the spacer pair adjacent the bottom end of the outer casing for meassuring an amount of water in the tank. A reference capacitor plate is also provided for providing a reference capacitance value corresponding to when the reference capacitor is fully submerged.

Accordingly, in contradistinction to the capacitance probe structure of copending application Ser. No. 517,590, wherein a plurality of short overlapping capacitors are sequentially activated to determine the height of liquid within the tank, the present invention describes an elongated capacitance probe structure having one or more capacitor plates extending substantially the length of an outer casing of the probe.

BRIEF DESCRIPTION OF THE DRAWINGS

For a more complete understanding of the present invention and the advantages thereof, reference is now made to the following Detailed Description taken in conjunction with the accompanying Drawings in which:

FIG. 2 is a sectional view of an underground storage tank fitted with the elongated capacitance probe of the present invention;

FIG. 3 is a perspective view, partialy cutaway and exploded, of the elongated capacitance probe of FIG. 2; and FIG. 4 is a cross-sectional view of the capacitance probe of FIG. 3 along lines 4—4' of FIG. 3.

DETAILED DESCRIPTION

Figure 1:
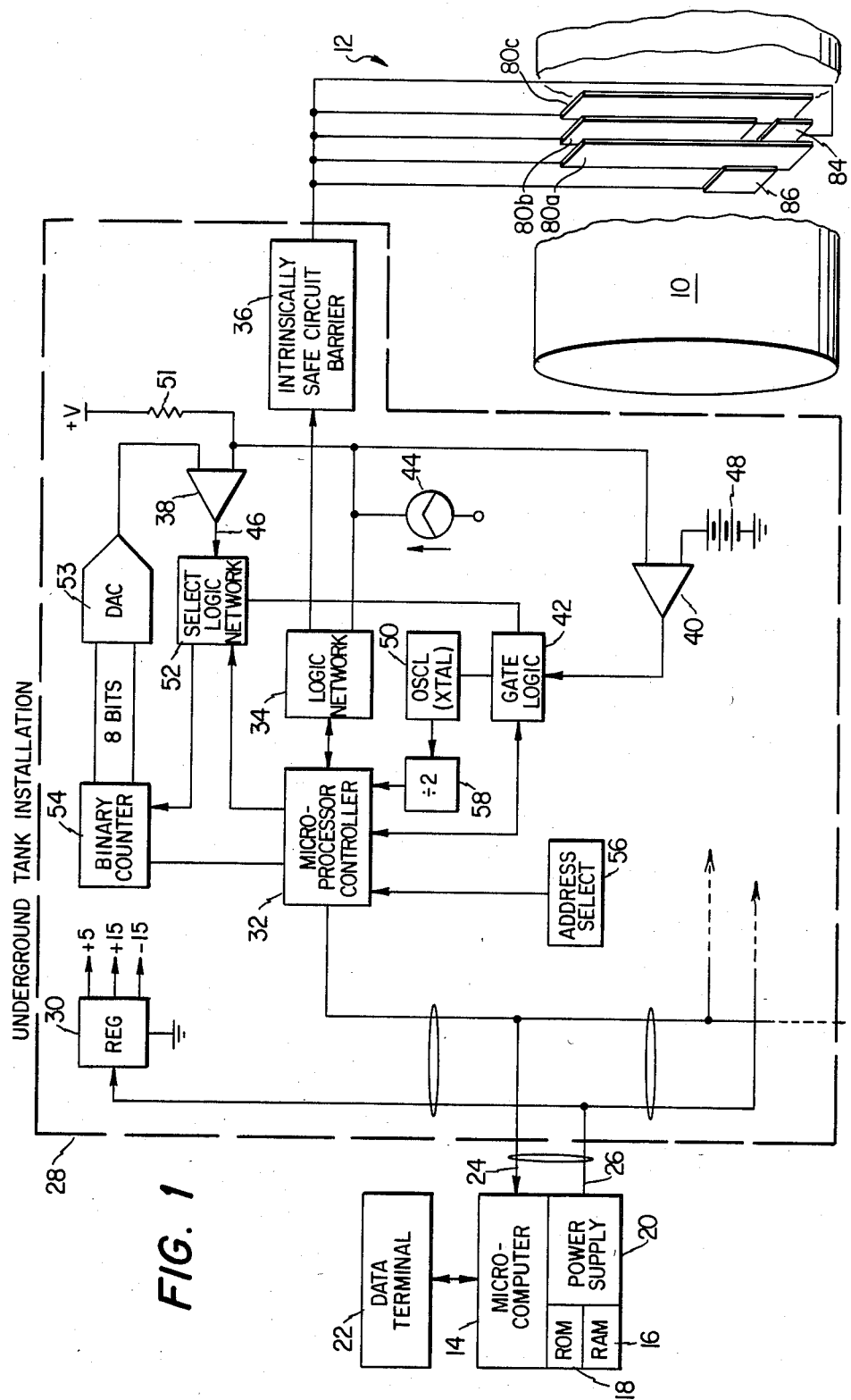
FIG. 1 is a block diagram of a liquid level and volume measuring system connected to a schematically illustrated elongated capacitance probe of the present invention.

With reference now to the figures wherein like reference characters designate like or similar elements throughout the several views, FIG. 1 is a schematic block diagram of a liquid level and volume measuring system for measuring the liquid level and volume of liquid within an underground tank 10 by means of an elongated, capacitance probe 12. Typically, the system of the present invention is used for measuring the volume of fuel within an underground tank such as commonly found in automobile and truck service stations. The volume of fuel in the tank 10 is determined by measuring the height of the liquid level/air interface by means of the capacitance probe 12. The capacitance probe 12 is mounted through a port in the top of the tank 10 and extends through the liquid level interface to the bottom of the tank. As will be described in more detail below, the capacitance probe 12 has a length approximately equally to the height of the tank 10. Underground fuel storage tanks are generally mounted with their longitudinal axis horizontal and thus FIG. 1 illustrates the usual orientation of the capacitance probe 12 in the tank 10.

To meassure the volume of fuel within the tank 10, the capacitance probe 12 is connected to a microcomputer-controlled measuring system including a microcomputer 14. The microcomputer 14 has an associated random access memory (RAM) 16, read only memory (ROM) 18, and power supply 20. The volume of liquid within the tank 10 and other data generated by the system of FIG. 1 is provided in a human readable format on a data terminal 22 connected to the microcomputer 14. The microcomputer 14 and the data terminal 22 are typically located remote from the remainder of the system illustrated in FIG. 1 and usually within an enclosure for the service station.

Connected to the microcomputer 14 by a means of a two-wire serial data link 24 and a four-wire unregulated DC voltage line 26 are up to sixteen tank measuring units 28. Only the details of one of the sixteen tank measuring units 28 is illustrated in FIG. 1. Typically, the measuring unit 28 is mounted underground at the tank 10 as will be described.

Each measuring unit 28 connected to the microcomputer 14 includes a regulated power supply 30 for providing regulated voltages to the other components of the measuring unit. Connected to the two-wire serial data link 24 is a microprocessor controller 32 capable of serial communication for recognizing and responding to a unique address on the two-wire serial data link 24. The unique address, one of up to sixteen, identifies a particular storage tank 10. This unique address is generated by the microcomputer 14 and enables the identification of measurement data with a particular storage tank.

Functioning with the microprocessor controller 32 to measure the volume of liquid within the tank 10 is a logic network 34 that identifies which of the capacitors of the probe 12 is being analyzed at any given time. For purposes of explanation only, probe 12 includes three capacitor plates 80a–c for determining the location of the liquid level interface, a bottom capacitor plate 84 for measuring the amount of water in the tank 10, and a reference capacitor plate 86 for providing a reference capacitance value corresponding to when the plate 86 is submerged. It should be appreciated that the schematic designation of the probe 12 of the present invention is exemplary and is not meant to be limiting. The logic network 34 communicates with the probe 12 through a barrier circuit 36 that provides intrinsically safe interconnection between the probe 12 and the logic network 34. Typically, the barrier circuit 36 consists of a network including a current limiting resistor.

Measurement data from the capacitance probe 12 is provided through the logic network 34 to a differential comparator 38 for temperature compensation, and a differential comparator 40. Connected to the differential comparator 40 is a constant current generator 44. The differential comparator 38 is connected to resistor 51 providing a current to voltage conversion for a current input from temperature sensors in the probe as more particularly described in copending application, Ser. No. 517,590. As also seen in FIG. 1, the eight bit output of a binary counter 54 feeds a digital-to-analog converter 53 which in turn feeds the differential comparator 38. Thus, the output of the differential comparator 38 and the line 46 is the difference between the output of the digital-to-analog converter 53 and the voltage produced by the temperature sensors in the probe.

Connected to a gate logic circuit 42 is the microprocessor controller 32 and a crystal controlled oscillator 50. The gate logic 42 connects the oscillator output to a select logic network 52 that also receives the frequency signal from the comparator 38 on the line 46. Operationally, the controller 32 controls the select logic network 52 to couple the frequency signal of the line 46 or the oscillator output from the gate logic 42 to the binary counter 54. The binary counter 54 provides measurement information from the capacitance probe 12 to the microprocessor controller 32. Also connected to the microprocessor controller 32 is address select logic 56 and a frequency signal from the oscillator 50. The frequency signal from the oscillator 50 is provided to the microprocessor controller 32 for clock operations through a divide-by-two network 58.

Operationally, the system of FIG. 1 is controlled by the microprocessor controller 32 which is in serial communication with the microcomputer system 14 over the two-wire serial data link 24. Microprocessor controller 32 responds to a unique address (1 of 16) on a common party line. A command is received over the serial data link 24 identifying the address of a particular measuring unit 28 to select one of the capacitors of the probe 12. By means of the logic network 34, the microprocessor controller 32 selects the identified capacitor of probe 12 and sends a select complete message over the data link 24 to the microcomputer system 14. Next the microcomputer system 14, through the data link established to the microprocessor controller 32, commands the controller 32 to begin a capacitance reading cycle for the selected capacitor. By means of the gate logic 42 the output of the constant current generator 44 begins to charge the identified capacitor through the logic network 34. As the charged voltage in the capacitor builds up linearly, it is monitored by the differential comparator 40 and compared to the reference voltage 48. When a charged voltage reaches the reference voltage, the comparator output switches, sending a signal to the gate logic 42.

At the same time as the gate logic 42 starts charging the selected capacitor from the constant current generator 44, the output of the crystal oscillator 50 is connected to the binary counter 54 by means of the gate logic 42 and through the select logic 52. During the time interval between the start of the capacitor charge and the generation of the output signal from the comparator 40 to the gate logic 42, a count is accumulated in the binary counter 54. Thus, the binary count in the counter 54 starts when a charging of the capacitor begins and continues to increase until the charged voltage reaches the reference voltage. At that time, the gate logic 42 disconnects the oscillator 50 from the binary counter 54. Thus, the count in the binary counter 54 is linearly proportional to the capacitance of the selected capacitor. This binary count is a measure of the time required to charge a capacitor by means of the constant current generator 44 from a zero voltage to a fixed voltage level.

When the gate logic 42 receives a signal from the differential comparator 40, it also sends an instruction to the microprocessor controller 32 that the capacitance measurement cycle has been completed. The microprocessor controller 32 then addresses the binary counter 54 to transfer the stored count therein to the microcomputer system 14. This completes a read cycle for the selected capacitor of the probe 12. The microcomputer system 14 then instructs the microprocessor controller 32 to begin a read cycle for another capacitor of the probe 12, unless all capacitors of the probe have been read. According to the invention, once the capacitors 80a–c of the probe have been read, the measured capcitance value is determined to form a value from which the height of the liquid level interface is then determined.

The microcomputer system 14 also includes sufficient non-volatile memory for storing the minimum (empty) binary count representing the capacitance of the capacitors 80a–c in a dielectric of air and it also has sufficient memory to store a maximum (immersed in fuel) binary count representing the capacitance value calculated by the reference capacitor 86. Thus, the microcomputer system 14 is connected to sufficient memory to store the minimum and maximum binary count for each capacitor of the capacitance probe and for up to sixteen probes. A feature of the present invention is that the minimum and maximum binary counts are initial calibrations depending on the fuel in the tank 10 and these values are not changed during the operation of the measurement sequence.

A measurement sequence completed by means of the microcomputer system 14 commences by identifying a Particular probe 12 by selecting the address of the interconnected measuring unit 28. It will be recognized that the position of the probe 12 within the tank 10 is known as a result of the positioning of the individual capacitors on the probe during assembling and also the mounting of the probe in the tank during installation.

After the measurement cycle, the data representing the height of liquid within the tank 10 and also the volume of fuel therein is transferred to the data terminal 22. The data terminal provides the human interface to the system and includes controls to allow an operator to request a particular tank reading, the time and data, calibrate a probe of any tank, calibrate the tank or place the system in automatic operation, whereby all of the tanks are polled on a regular programmable schedule and checked for drop in level.

Referring now to FIG. 2, a sectional view is shown of the underground storage tank 10 of FIG. 1 fitted with the elongated capacitance probe 12 of the present invention. As seen in FIG. 2, the probe 12 has a top end 62 located adjacent the top of the tank 10 when the probe is mounted therein, and a bottom end 64 adjacent the bottom end of the tank 10. As discussed above with respect to FIG. 1, the storage tank 10 is mounted with its longitudinal axis horizontal and is generally located several feet below a manhole access port 63. A vertical riser pipe 65 is provided to connect the upper end of the tank 10 to the manhole access port 63. The elongated capacitance probe 12 of the present invention includes a canister assembly 66 which supports the electronic circuitry discussed above with respect to FIG. 1. The canister assembly 66 is secured within the riser pipe 65 by a lock plate 67. A conduit 68 and associated fittings is also provided to connect the various electrical connectors in the measuring system between a junction box 69 and the circuit boards in the canister assembly 66. The junction box 69 is connected via conduit 71 to similar junction boxes associated with other underground tanks (not shown), which are in turn all connected to the microcomputer system 14 as discussed above with respect to FIG. 1.

Referring now to FIG. 3, a perspective view, partially cutaway and exploded, is shown of the preferred embodiment of the capacitance probe 12 of FIG. 2 for use in the fluid level and volume measuring system of FIG. 1. The probe 12 comprises the outer casing 60 having the top end 62 located adjacent the top of the tank 10 when the probe is mounted therein, and the bottom end 64 adjacent the bottom end of the tank. The top and bottom ends 62 and 64 of the outer casing 60 define a length of the outer casing which is thus approximately equal to a height of the tank. The outer casing 60 preferably comprises first and second substantially semi-circular portions 70 and 72 which are matingly engaged as will be described in more detail below.

As also seen in FIG. 3, the probe 12 includes a plurality of spacers mounted in opposed relation in the first and second portions 70 and 72 to form spacer pairs 74 and 76, the spacer pairs located in a spaced apart relationship along a longitudinal axis 75 of the outer casing 60. Each spacer pair 74 and 76 includes identical plastic spacers, e.g., spacers 74a and 74b, for supporting the various elements of the probe. Although not shown in detail in FIG. 3, spacer pairs are provided along the entire longitudinal axis 75 of the probe 12.

Referring simultaneously to FIGS. 3 and 4, the probe 12 includes a plurality of ground plates 78a–e mounted in the spacer pairs in a spaced apart relationship. The ground plates are electrically-connected together via connector 79 which is then passed through the canister assembly 66 of FIG. 2 and attached to an external ground. As seen in FIG. 3, the one or more capacitor plates 80a–c of FIG. 1 are also adapted for support in the spacer pairs. Each capacitor plate 80a–c extends substantially the entire length of the outer casing 60 and is supported between a pair of ground plates. For example, capacitor plate 80b is located between the ground plates 78b and 78c. Likewise, capacitor plate 80c is located between the ground plates 78c and 78d.

Moreover, each of the capacitor plates 80a–c in combination with its respective ground plate 78a–c forms a capacitor extending substantially the entire length of the probe 12. These capacitors are charged as discussed above with respect to the measuring system of FIG. 1 to determine the liquid level interface and the volume of fuel in the tank.

As also seen in FIG. 3, the probe 12 includes the bottom capacitor plate 84 mounted in the spacer pair 72. Plate 84, in conjunction with ground plate 78b, forms a bottom capacitor for measuring the level of any water at the bottom of the underground tank. As best seen in FIG. 4, plate 84 has a longitudinal groove 85 which increases the effective surface area of the plate. The probe 12 also includes the reference capacitor plate 86 as discussed above with respect to FIG. 1 which, in conjunction with ground plate 78d, forms a reference capacitor for generating a reference capacitance value when the tank 10 is full to a point to fully submerge the capacitor plate 86. The reference capacitor plate 86 is mounted adjacent the bottom end 64 of the probe 12 but above the bottom capacitor plate 84. A plurality of insulator plates 82a–d are also provided in the probe 12 for insulating the capacitor plates 80a–c from the bottom end 64 of the probe, and for insulating capacitor plate 80b from the bottom capacitor plate 84. Each of the insulator plates 82a, 82b and 82c are secured to the respective capacitor plates 80a, 80b and 80c and supported between the ground plates 78. Likewise, insulator plate 82d is secured to the reference capacitor plate 86.

The probe 12 also includes a printed circuit board (PCB) 88 as seen in FIGS. 3 and 4 secured to an interior wall of the second semi-circular portion 68 of the outer casing 60. The printed circuit board 88 supports a temperature sensor, and a plurality of such boards are located in like fashion along the longitudinal axis 75 of the probe 12.

The capacitance probe 12 of the present invention also includes a cover plate 90 having apertures 92 through which the fuel enters the probe 12 once the probe 12 has been placed in the tank. Located adjacent to the top end 62 of the outer casing 60 is a gauge fitting 94 which secures the canister assembly 66 to the outer casing 60. Gauge fitting 94, which is threaded to the bottom end of the canister assembly 66, includes side portions 95 for securing the fitting to the outer casing 60. The canister assembly 66 includes a solid plug 97, which abuts the top end 62 of the outer casing upon assembly of the probe 12, and includes an aperture therein through which the electrical connectors 98 pass.

Referring now to FIG. 4, a cross-sectional view of the capacitance probe 12 of FIG. 3 along lines 4—4' is shown. As discussed above with respective to FIG. 3, the outer casing 60 comprises the first semi-circular portion 70 matingly engaged with the second semi-circular portion 72. Specifically, the portions 70 and 72 of the outer casing 60 are replicas of each other and include supporting ribs 99 for supporting a spacer pair, such as the spacer pair 74a-74b. Each of the portions 70 and 72 include a mating flange 100 having a lip 102 at its terminal end. Each portion 70 and 72 also includes a circular support rib 106 having a lip 108 at its terminal end. As seen in FIG. 4, the lip 102 of the first semi-circular portion 70 is designed to matingly engage the lip 108 of the second semi-circular portion 72. Likewise, the lip 102 of the second semi-circular portion 72 matingly engages the lip 108 of the first semi-circular portion 70 to form the completed outer casing 60. Each of the circular support ribs 106 of the first and second semi-circular portions 70 and 72 receive screws 112 which secure side portions 95 of the gauge fitting 94 as shown in FIG. 3. Side portions 95 of the gauge fitting 94 are supported on outer support ribs 116 of the first and second semi-circular portions 70 and 72 of the outer casing 60. As also seen in FIG. 3, the printed circuit board (PCB) 88 is secured in the circular support rib 106 of the second semi-circular portion 72 by the screw 118.

Each spacer pair, such as the pair 74 including spacers 74a and 74b, preferably includes an alternating tongue/groove structure comprising support posts 120 and apertures 122. The apertures 122 receive ends 124 of the ground plates 78a-e, and the support posts 120 matingly engage grooves in the capacitor plates 80a-c and the insulator plate 82d. When fuel enters the apertures 92 of the cover plate 90, it is received within the spaces 128 between the capacitor plates 80 and the ground plates 78.

In the preferred embodiment of the invention, the first and second semi-circular portions 70 and 72 of the outer casing 60 are formed of extruded aluminum. Likewise, each of the capacitor plates 80a-c, 84 and 86 are formed of extruded aluminum, and the capacitor plates 80a-c are then anodized the color black in a two-step heat treatment finishing process. The bottom capacitor plate 84 is preferably coated with epoxy because water is conductive and would short out the capacitor otherwise. Each of the ground plates 78 is also formed of an extruded aluminum with the surfaces thereof polished to a satin finish. The insulator plates 82 are formed of a composite material which includes approximately 30% or more glass filler. The spacer pairs and the cover plate 90 are preferably formed of a plastic material. It should also be appreciated that the capacitance probe may include one or more of the substantially full-length capacitor plates, such as plates 80a-c. Of course, by increasing the number of such plates, the accuracy of the liquid level interface measurement is significantly improved.

In operation, the capacitance probe 12 is mounted into the tank 10 with the associated canister assembly 66 as discussed above with respect to FIG. 2. As fuel fills the tank, it enters the probe through the apertures 92 in the cover plate 90 and fills the empty spaces 128 surrounding the capacitors comprising the ground and capacitor plates 78 and 80. As fuel rises in the probe, the capacitance of the capacitors changes in a linear relationship from a value where the dielectric is air to a value with fuel as the dielectric. Typically, the dielectric change between fuel and air is two to one. As explained previously, with the calibrated empty and full binary count stored in the microcomputer system 14 for the probe 12, any liquid level height between zero and full is calculable. In the preferred embodiment of the invention, the capacitance is measured by operation of the measuring unit 28 in the microprocessor controller 32. Preferably, a number of capacitance measurement is made for each of the full-length capacitors and these values are then combined to determine the liquid level interface.

An additional function of the system of the present invention is to periodically check each tank 10 for any water accumulation. When the microcomputer system 14 is placed in a test mode of operation, it transmits the address of a selected tank 10 by means of the two-wire serial data link 24 to the interconnected measuring unit 28. Also transmitted to the measuring unit 28 is the address of the bottom capacitor plate 84. The capacitance of the capacitor plate 84 is measured as previously explained for any capacitor on the probe 12. This measured value of capacitance represented in the form of a binary count in the counter 54 is transmitted to the microcomputer system 14. The microcomputer system 14 compares the measured value to the stored fully submerged in fuel value, obtained from the reference capacitor 86, and also a stored value for the capacitor 84 completely submerged in water. Typically, the value of a capacitor of the probe 12 submerged in water is forty times that of the same capacitor submerged in fuel. By a computation utilizing the measured value, the stored fully submerged in fuel value, and the stored fully submerged in water value, the volume of water in a tank 10 is computed.

While the present invention has been described with respect to specific details thereof, it should be understood that various changes and modifications will be suggested to one skilled in the art to which the invention relates, and it is intended to encompass those changes and modifications which fall within the scope of the appended claims.

I claim:

1. An elongated capacitance probe for use in a measuring system for locating a liquid level interface in a tank, comprising:

an outer casing having top and bottom ends defining a length thereof approximately equal to a height of said tank;

a plurality of spacers mounted in opposed relation in said outer casing to form spacer pairs, said spacer pairs located in a spaced apart relationship along a longitudinal axis of said outer casing;

a plurality of ground plates mounted in a spaced apart relationship in said spacer pairs; and one or more capacitor plates mounted in said spacer pairs, each extending substantially the length of said outer casing and in combination with one of said ground plates forming a capacitor extending substantially the length of said outer casing, for determining the location of said liquid level interface in said tank.

2. An elongated capacitance probe for use in a measuring system as described in claim 1 wherein each of said one or more capacitor plates are mounted between a pair of said ground plates.

3. The elongated capacitance probe for use in a measuring system as described in claim 1 further including a bottom capacitor plate mounted in said spacer pairs adjacent said bottom end of said outer casing, said bottom capacitor plate in combination with one of said ground plates forming a capacitor for measuring an amount of water in said tank.

4. The elongated capacitance probe for use in a measuring system as described in claim 3 further including a reference capacitor plate mounted in said spacer pairs between a pair of said ground plates and above said bottom capacitor plate, said reference capacitor plate in combination with one of said ground plates forming a reference capacitor for producing a reference capacitance value when said reference capacitor is submerged.

5. The elongated capacitance probe for use in a measuring system as described in claim 1 further including one or more insulator plates secured to said one or more capacitor plates, respectively, for insulating said one or more capacitor plates from said bottom end of said outer casing.

6. An elongated capacitance probe for use in a measuring system for locating a liquid level interface in a tank, comprising:

an outer casing having top and bottom ends defining a length thereof approximately equal to a height of said tank;

a plurality of spacers mounted in opposed relation in said outer casing to form spacer pairs, said spacer pairs located in a spaced apart relationship along a longitudinal axis of said outer casing;

a pluralty of ground plates mounted in a spaced apart relationship in said spacer pairs;

a first capacitor plate mounted in a spacer pair adjacent said bottom end of said outer casing, said first capacitor plate and one of said ground plates forming a bottom capacitor for measuring an amount of water in said tank;

a reference capacitor plate mounted in a spacer pair and above said bottom capacitor plate, said reference capacitor plate and one of said ground plates forming a reference capacitor for producing a reference capacitance value when said reference capacitor is submerged; and one or more capacitor plates each extending substantially the length of said outer casing and mounted in said spacer pairs, each of said one or more capacitor plates in combination with one of said ground plates forming a capacitor extending substantially the length of said outer casing for determining the location of said liquid level interface in said tank.

7. The elongated capacitance probe for use in a measuring system as described in claim 6 further including a canister assembly attached to said top end of said outer casing, said canister assembly for supporting electronic components of said measuring system.

8. The elongated capacitance probe for use in a measuring system as described in claim 6 further including a cover plate attached to said bottom end of said outer casing, said cover plate including apertures therein through which the liquid in said tank enters said capacitance probe.

9. The elongated capacitance probe for use in a measuring system as described in claim 6 wherein each of said spacers includes an alternating tongue and groove structure for receiving said one or more capacitor plates and said plurality of ground plates, respectively.

10. An elongated capacitance probe for use in a measuring system for locating a liquid level interface in a tank, comprising:

an outer casing having first and second matingly engaging portions, said outer casing having top and bottom ends defining a length thereof approximately equal to a height of said tank;

a plurality of spacers mounted in opposed relation in said outer casing to form spacer pairs, said spacer pairs located in a spaced apart relationship along a longitudinal axis of said outer casing;

a plurality of ground plates mounted in a spaced apart relationship in said spacer pairs;

a first capacitor plate mounted in a spacer pair adjacent said bottom end of said outer casing, said first capacitor plate and one of said ground plates forming a bottom capacitor for measuring an amount of water in said tank;

a reference capacitor plate mounted in a spacer pair and above said bottom capacitor plate, said reference capacitor plate and one of said ground plates forming a reference capacitor for producing a reference capacitance value when submerged;

one or more capacitor plates each extending substantially the length of said outer casing and mounted in said spacer pairs, each of said one or more capacitor plates in combination with one of said ground plates forming a capacitor extending substantially the length of said outer casing for determining the location of said liquid level interface in said tank;

one or more insulator plates secured to said one or more capacitor plates, respectively, for insulating said one or more capacitor plates from said bottom end of said outer casing;

a canister assembly attached to said top end of said outer casing for supporting electronic components of said measuring system; and a cover plate attached to said bottom end of said outer casing, said cover plate including apertures therein through which the liquid in said tank enters said capacitance probe.

* * * * *

UNITED STATES PATENT AND TRADEMARK OFFICE
CERTIFICATE OF CORRECTION

PATENT NO. : 4,591,946

DATED : May 27, 1986

INVENTOR(S) : Woodrow W. Pope

It is certified that error appears in the above-identified patent and that said Letters Patent is hereby corrected as shown below:

```
Column 2, line 11, change "meassuring" to --measuring--;
          line 67, change "meassure" to --measure--.
Column 5, line 32, change "data," to --date,--.
Column 10, line 17, change "wherein" to --where--.
```

Signed and Sealed this

Twenty-third Day of December, 1986

Attest:

DONALD J. QUIGG

*Attesting Officer*      *Commissioner of Patents and Trademarks*